(12) United States Patent
Kipnis

(10) Patent No.: US 11,441,425 B1
(45) Date of Patent: Sep. 13, 2022

(54) SEPARATE COMPRESSOR ARRANGEMENTS FOR ENGINES

(71) Applicant: Cyclazoom, LLC, Skokie, IL (US)

(72) Inventor: Michael Kipnis, Skokie, IL (US)

(73) Assignee: Cyclazoom, LLC, Skokie, IL (US)

(*) Notice: Subject to any disclaimer, the term of this patent is extended or adjusted under 35 U.S.C. 154(b) by 0 days.

(21) Appl. No.: 17/662,089

(22) Filed: May 5, 2022

(51) Int. Cl.
*F01B 17/02* (2006.01)
*B60K 3/02* (2006.01)
*F02B 75/02* (2006.01)

(52) U.S. Cl.
CPC ............ *F01B 17/02* (2013.01); *B60K 3/02* (2013.01); *F02B 2075/025* (2013.01)

(58) Field of Classification Search
CPC . F01B 17/02; F01B 29/10; B60K 3/02; F02B 2075/025; F02B 37/00; F02M 69/46
See application file for complete search history.

(56) References Cited

U.S. PATENT DOCUMENTS

| | | | |
|---|---|---|---|
| 5,491,977 A | 2/1996 | Cho et al. | |
| 6,311,486 B1 * | 11/2001 | Negre | F01B 17/02 60/412 |
| 6,449,965 B1 | 9/2002 | Murao et al. | |
| 7,111,704 B2 | 9/2006 | Johnson | |
| 7,621,253 B2 | 11/2009 | Mirabile | |
| 7,634,988 B1 * | 12/2009 | Salminen | F02B 33/22 123/316 |
| 8,191,517 B2 | 6/2012 | Mustafa | |
| 8,322,138 B2 | 12/2012 | Jackson | |
| 8,499,727 B1 | 8/2013 | Pett, Jr. | |
| 8,714,119 B2 | 5/2014 | Pett, Jr. | |
| 9,033,834 B2 | 5/2015 | Harlann et al. | |
| 2011/0220082 A1 * | 9/2011 | Meldolesi | F02B 41/06 123/70 R |
| 2011/0303185 A1 * | 12/2011 | Zajac | F02B 41/02 123/275 |
| 2014/0053552 A1 * | 2/2014 | Im | F01K 3/10 60/273 |

* cited by examiner

*Primary Examiner* — Syed O Hasan
(74) *Attorney, Agent, or Firm* — Brian Roffe

(57) ABSTRACT

Apparatus for providing a source of compressed air for an engine having an engine cylinder and an engine crank shaft, includes a rotatable compressor crank shaft, a compressor cylinder defining an interior space and including a surface defining the interior space having first and second apertures, a valve in each aperture, a piston compressor moved upon rotation of the compressor crank shaft in the interior space of the compressor cylinder, a compressor intake conduit leading from ambient environment to one aperture, and an air tank. The apparatus also includes a compressor outlet conduit leading from the other aperture to the air tank, an engine intake conduit leading from the air tank to an interior space of the engine cylinder, and interconnection structure that interconnects the compressor crank shaft to the engine crank shaft such that rotation of the engine crank shaft causes rotation of the compressor crank shaft.

16 Claims, 2 Drawing Sheets

SEPARATE COMPRESSOR ARRANGEMENTS FOR ENGINES

FIELD OF THE INVENTION

The present invention relates to compressor arrangements for engines, and apparatus for providing a source of compressed air for an engine. The present invention also relates to engines that include such compressor arrangements and methods for providing compressed air to engines and methods for improving engine performance. The present invention also relates to methods for configuring an engine to have multiple sources of compressed air, which are active based on operating conditions of the engine or a reservoir of compressed air.

OBJECTS AND SUMMARY OF THE INVENTION

It is an object of at least one embodiment of the present invention to provide new and improved compressor arrangements for engines that generate compressed air for subsequent direction to the engine to be mixed with fuel and then ignited to created motive power.

It is another object of at least one embodiment of the present invention to provide new and improved engines that include compressor arrangements that generate compressed air for subsequent direction to the engine to be mixed with fuel and then ignited to created motive power.

It is another object of at least one embodiment of the present invention to provide new and improved methods for providing compressed air to engines and methods for improving engine performance.

It is another object of at least one embodiment of the present invention to provide new and improved methods for configuring an engine to have multiple sources of compressed air, which are active based on operating conditions of the engine or a reservoir of compressed air.

In order to achieve one or more of these objects and possibly one or more other objects, an apparatus for providing a source of compressed air for an engine having an engine cylinder and an engine crank shaft, includes a rotatable compressor crank shaft, a compressor cylinder defining an interior space and including a surface defining the interior space having a first aperture and a second aperture, a first valve in the first aperture, a second valve in the second aperture, a piston compressor moved upon rotation of the compressor crank shaft in the interior space of the compressor cylinder, a compressor intake conduit leading from ambient environment to the first aperture, and an air tank. The apparatus also includes a compressor outlet conduit leading from the second aperture to the air tank, an engine intake conduit leading from the air tank to an interior space of the engine cylinder of the engine, and interconnection structure that interconnects the compressor crank shaft to the engine crank shaft such that rotation of the engine crank shaft causes rotation of the compressor crank shaft.

In use, rotation of the compressor crank shaft causes movement of piston compressor in the interior space of the compressor cylinder and compression of air inlet into the interior space through the compressor intake conduit and the first valve and outflow of compressed air through the compressor outlet conduit and the second valve to the air tank.

In one embodiment, the interconnection structure includes an automatic clutch connected to the engine crank shaft and a gear connected to the automatic clutch and the compressor crank shaft. The piston compressor may include a rod connected eccentrically to the compressor crank shaft. The piston compressor may further include a piston connected to the rod and movable in the interior space while surrounded by the compressor cylinder.

An engine in accordance with the invention includes an engine cylinder defining an interior space and including a surface defining the interior space having a first aperture and a second aperture, the interior space being supplied with ignitable fuel, an engine crank shaft. An engine piston moves upon rotation of the engine crank shaft in the interior space of the engine cylinder. There is a first valve in the first aperture, a second valve in the second aperture, an air tank, an engine intake conduit leading from the air tank to the first aperture, an igniter for igniting a mixture of fuel and air in the interior space, and an engine outlet conduit leading from the second aperture. The engine also includes an apparatus for providing a source of compressed air for the interior space such as described above.

Specifically, this apparatus includes a rotatable compressor crank shaft, a compressor cylinder defining an interior space and including a surface defining the interior space having a first aperture and a second aperture, a valve in the first aperture of the surface of the compressor cylinder, another valve in the second aperture of the surface of the compressor cylinder, a piston compressor moved upon rotation of the compressor crank shaft in the interior space of the compressor cylinder, a compressor intake conduit leading from ambient environment to the first aperture of the surface of the compressor cylinder, a compressor outlet conduit leading from the second aperture of the surface of the compressor cylinder to the air tank, and interconnection structure that interconnects the compressor crank shaft to the engine crank shaft such that rotation of the engine crank shaft causes rotation of the compressor crank shaft.

Rotation of the compressor crank shaft causes movement of piston compressor in the interior space of the compressor cylinder and compression of air inlet into the interior space through the compressor intake conduit and the valve in the first aperture and outflow of compressed air through the compressor outlet conduit and the valve in the second aperture to the air tank.

In one embodiment, the engine also includes a turbocharger connected to the engine outlet conduit, a turbocharger compressor connected to the turbocharger, a turbocharger compressor inlet conduit leading from the ambient environment, and a compressor conduit leading from the turbocharger compressor to the air tank. With this structure, exhaust gas flowing through the engine outlet conduit interacts with the turbocharger to power the compressor to draw and compress air from the ambient environment and provide the compressed air to the air tank.

In a similar manner, an engine may be provided with the turbocharger/compressor combination and without the piston compressor.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
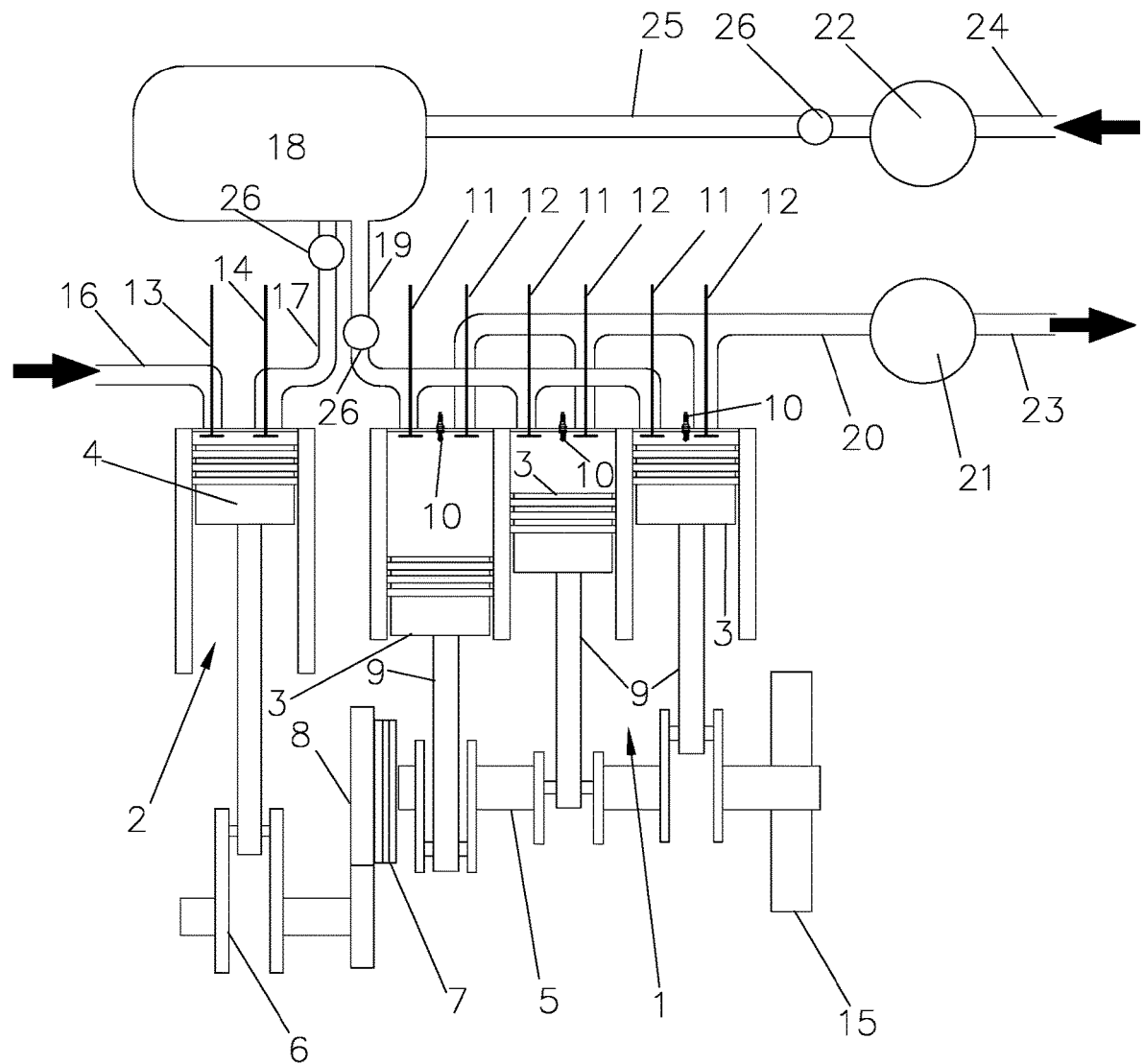
FIG. 1 is a schematic of a compressor (combination of compressors) in accordance with the invention shown applied to an internal combustion engine.

Referring to the accompanying drawings wherein the same reference numbers refer to the same or similar components, FIG. 1 is a schematic of relevant parts of an engine 1 needed to provide an explanation of the invention. Engine 1 has a form and includes components to enable it to function in the traditional manner of an engine. Some of the components are shown and identified while others may be present but do not interact with the novel parts of the engine in accordance with the invention.

The invention may be considered a separate compressor arrangement for an engine which is a structure or assembly that increases the pressure or density of air supplied to an internal combustion engine. This gives each intake cycle of the engine more oxygen, letting it burn more fuel and do more work, thus increasing the power output of the engine. At the same time, the efficiency of the engine is increased. This leads to a correspondingly cleaner engine emissions and lower pollution.

Engine 1 includes a compressor 2 including a piston compressor 4 having a rod connected to a compressor crank shaft 6, e.g., in a manner known to those skilled in the engine field such as eccentrically. A head portion of the piston in the piston compressor 4 is movable in a cylindrical compartment of a housing of the compressor 2 to compress gas between the exposed surface of the head portion of the piston and the inner surface of the housing of the compressor 2 (the compressor housing) defining the compartment, i.e., in this case, the upper surface of the head portion of the piston and the lower surface of the compressor housing. The lower surface of the compressor housing has two apertures separated from one another and which each lead into a respective conduit. An interior space is defined by the housing of the compressor 2 and is open to the bottom so that the piston rod can extend into the interior space.

One conduit 16 is a compressor air intake conduit through which air flows to be inlet into the compressor through an intake port, which is one of the apertures in the lower surface of the compressor housing. The other conduit 17 is a compressor outlet or outtake conduit through which air flows when outlet from the compressor through an outlet port, which is the other one of the apertures in the lower surface of the compressor housing. Conduit 17 leads to a high pressure air tank 18.

Preferably, valves 13, 14 are situated in each of the intake and outlet ports to regulate the flow of air from the ambient atmosphere or environment into the compressor and the flow out of the compressor to the air tank 18. These valves 13, 14 can have any known structure for a valve used with a piston cylinder to regulate air or gas inflow or outflow. The manner in which these valves 13, 14 are controlled to be cycle-dependent to enable air to be inlet for subsequent compression when in the interior space and the compressed air to be outlet is known to those skilled in the art to which this invention pertains. Generally, valve 13 would be open during the inlet of air into the interior space and valve 14 would be closed at this time, and valve 13 would be closed and valve 14 would be open when the compressed air is being outlet to the air tank 18.

Engine 1 also includes a plurality of engine pistons 3, three of which are shown, but which number does not limit the invention in any manner whatsoever and more or less than three engine pistons 3 may be provided in an engine in accordance with the invention. Also, although the engine pistons 3 are shown in a row, other configurations and relative arrangements of multiple engine pistons and the cylinders in which they move are also possible and considered to be within the scope of the invention.

Each piston 3 includes a rod 9 connected to a common engine crank shaft 5, and a head portion of the piston movable in a cylindrical compartment of a housing of the engine 1 to compress gas between the exposed surface of the head portion of the piston and the inner surface of the housing of the engine 1 defining the compartment, i.e., in this case, the upper surface of the head portion of the piston and the lower surface of the housing of the engine 1. The lower surface of the housing of the engine 1 has two apertures separated from one another and which each lead into a respective conduit. A spark plug 10 is provided for each engine cylinder above a respective piston 3, and represents any mechanism to generate a spark to cause ignition of gas in the compartment.

An automatic clutch 7 is connected to one end of the engine crank shaft 5. A gear 8 is alongside the clutch 7 and connected via cooperating teeth to the compressor crank shaft 6. An opposite end of the engine crank shaft 5 is connected to an engine flywheel 15. The connections of the engine structure to other parts of an engine and a vehicle as known to those skilled in the art to which this invention pertains may be used in the invention.

Gear 8 has a conventional structure with teeth, the size, shape, number and arrangement of which can vary to optimize the invention, which optimization would be readily ascertainable to those skilled in the art to which this invention pertains. Gear 8 is arranged to provide the necessary capacity of the compressor 2. Gear 8 is provided to enable powering of the piston compressor 4 to feed the air tank 18 with compressed air, in combination with the compressor 22 to thereby enable operation of the engine 1 being provided with compressed air to the piston cylinders thereof. When the pressure in the air tank 18, which may be monitored by a monitoring device associated with or attached to the air tank 18 (not shown), reaches a necessary magnitude, the piston compressor 4 can be disconnected from the engine 1 by the automatic clutch 7 and air supply will be only from the high efficiency compressor 22 (the state shown in FIG. 2). The automatic clutch 7 can be re-connected to the piston compressor 4 whenever necessary or desired.

Automatic clutch 7 is therefore controlled by a control device or mechanism to provide two different operating states, one operating state wherein the rotation of the engine crank shaft 5 is transferred to the compressor crank shaft 6 (so that compressor 2 compresses air and supplies the compressed air to the air tank 18), and another operating state wherein the rotation of the engine crank shaft 5 is not and cannot be transferred to the compressor crank shaft 6 (wherein compressed air is supplied only by compressor 22). One skilled in the art would be able to define the control parameters to regulate the operation of the compressor to toggle or switch between these two operating states.

The surface of the engine housing defining the piston cylinders has two apertures for each compartment separated from one another and which each lead into a respective one of a pair of conduits 19, 20. Conduit 19 is an engine intake conduit through which air flows from the high pressure air tank 18 to be inlet into the piston cylinders of the engine 1 through a respective intake port, which is one of the apertures in the surface of the engine housing defining the piston cylinders. The other conduit 20 is an engine exhaust outlet or outtake conduit through which combustion gas products flow when outlet from the piston cylinders in the engine 1 through outlet ports, which is the other one of the apertures in the surface of the engine housing defining the piston cylinders.

Preferably, valves 11, 12 are situated in each of the intake and outlet ports of each of the piston cylinders of the engine 1 to regulate the flow into the piston cylinders compartments and the flow out of the piston cylinders compartments. These valves 11, 12 can have any known structure for a valve used with a piston cylinder to regulate air or gas inflow or outflow.

Conduit 20 leads to a turbocharger 21 and provides exhaust gas to the turbocharger 21. The turbocharger has a construction known to those skilled in the art and converts energy from the exhaust gas into energy to operate a compressor 22. In one embodiment, the turbocharger 21 and compressor 22 are connected to a common shaft so that this shaft is rotated by the outflow of exhaust gas, i.e., the exhaust gas impacts against part of the turbocharger 21 and causes rotation of the shaft, which shaft rotation is then used to compress air being inlet through the compressor inlet 24. This shaft is not shown in the illustrated embodiments, partly in view of the schematic representation of these elements. Other connections between the turbocharger 21 and the compressor 22 may also be used in the invention.

In some embodiments, power for the air compressor 22 can be provided mechanically by means of a belt, shaft or chain connected to the engine's crankshaft additionally or alternatively to being provided by a turbocharger driven by exhaust gas, or any combination of any of these means to provide power to the air compressor 22.

Air compressor 22, itself, can be a type of turbocharger, supercharger, electrical or any combination of these, for example, a turbocharger and supercharger which provides a very high efficiency compressed air supply at any RPM.

Air compressed by the compressor 22 is directed through a conduit 25 to the high pressure air tank 18 to be available for use by the engine 1, via conduit 19.

An important aspect of the invention is that the amount of compressed air in the high pressure air tank 18 is increased because it is not only the result of action by the compressor 22 to compress air being inlet through the compressor inlet 24, but also receives air compressed by the action of the piston compressor 4. Accordingly, there are two compressors associated with the engine, namely, compressor 22 operated by the turbocharger 21 and compressor 2 operated by the interconnection with the engine crank shaft 5. Thus, dual compressive action enhances the production of compressed air, greatly increasing its availability and volume, without major modifications to the engine 1.

For the sake or comparison, in a Scuderi-type engine, a compressor is a part of the engine just a separate cycle. By contrast, in the embodiment of the invention in FIG. 1, the compressor 2 is not a part of the engine 1 but is separated from the engine 1, yet moved by the engine 1 in view of the interconnection. Although this interconnection is shown by an automatic clutch 7, a gear 8 and a compressor crank shaft 6, other interconnection structure may be used without deviating from the scope and spirit of the invention. It is important though that the piston compressor 4 is moved within its cylinder to compress air based on already existing motive force. This already existing motive force is the rotational force of the engine crank shaft 5.

Valves 26, shown schematically, are preferably provided in or in association with the conduits 17, 19 and 25 and regulated or configured in a preferred operating state to be open when the engine 1 is operating and to be closed when engine 1 is not operating to maintain the air pressure in the air tank 18, e.g., at or above a desired, possibly predetermined or preconfigured level. A control device or mechanism (not shown) is coupled to the valves 26 to perform oversight and control functionality. Valves 26 may also be integrated into the air tank 18. The manner in which the valves 26 are placed in the conduits 17, 19, 25 and/or integrated into the air tank 18 may be any known technique to flow control. Generally, the valves 26 should be considered to present flow control means or a mechanism to control flow of the compressed air, enabling flow in certain operating conditions and preventing flow in other operating conditions. Other flow control schemes and mechanisms to ensure air pressure in the air tank 18 is maintained during non-operation of the engine 1 may also be used in the invention without deviating from the scope and spirit thereof.

Figure 2:
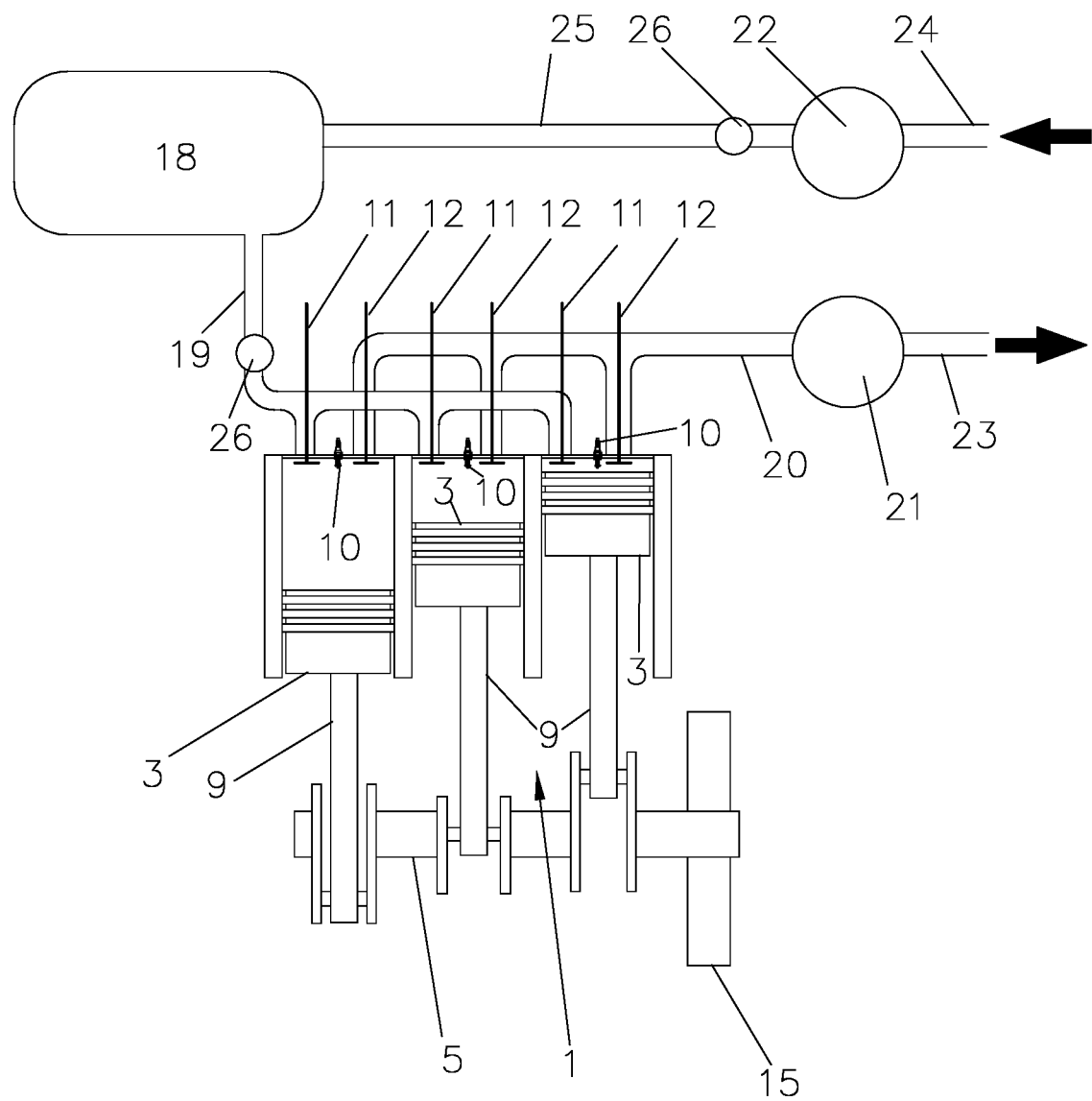
FIG. 2 is a schematic of a vehicle including a turbocharger or other power source (mechanical or electrical, for example) in accordance with the invention, excluding a piston compressor arrangement.

FIG. 2 shows an embodiment similar to the embodiment shown in FIG. 1 except that the piston compressor structure is omitted. This is also a possible construction of the invention, i.e., without the automatic clutch 7 connected to the common crank shaft 5 of the engine 1, without the gear connected to the automatic clutch 7, and without the compressor 2 and its piston compressor 4, without the compressor crank shaft 6. The valves 13, 14 and conduits 16, 17 are also omitted. Although the advantages of the presence of the compressor 2 are not obtained, this embodiment may still provide benefits relative to prior art engines with turbochargers, superchargers, electrical or any other known compressors.

The manner in which fuel is injected into the interior spaces of the engine cylinders is known to those skilled in the art to which this invention and is not depicted in the drawings. Any contemporary technology to achieve the fuel injection is possible in accordance with the invention. The interior space is defined by the housing of the engine 1 and is open to the bottom so that the rod can extend into the interior space.

By directing compressed air into the interior spaces of the engine cylinders, along with an air/fuel mixture, there is an increase in the filling of the interior spaces and therefore the power obtained from the displacement volume.

The internal combustion engine/piston (ICE) of prior art designs has a compressor itself and has compressor capabilities at the same time on an intake action cycle, to provide air for the burning fuel. However, they are invariably very low efficiency and therefore have high parasitic losses. An object of the invention described above is to reduce these losses, improve and increase the intake cycle efficiency and power the engine awhile at the same time, reducing emissions and pollution. By providing compressor 22, with or without the compressor 2, an arrangement is designed to be highly efficient, relative to prior art constructions, and combined with electric, twin screw, supercharger, turbochargers or any other type of structure.

As used herein, the ambient environment or the ambient atmosphere is any space or area outside of the engine or the compressor. It is not an internal cavity or space but rather is the space or area around the engine or the vehicle in which the engine is situated or even within the vehicle, but not within the engine or compressor.

The invention also relates to a method for compressing air using an engine having an engine crank shaft. In this method, the rotatable compressor crank shaft 6 is selectively coupled to the engine crank shaft 5, which means that at times it is connected while at other times, it is not connected. Compressed air is generated upon rotation of the compressor crank shaft 6 by causing the compressor crank shaft 6 to move the piston compressor 4 in an interior space of a compressor cylinder, regulating flow of air from ambient environment into the interior space defined in part by the piston compressor through the valve 13, and regulating flow of compressed air from the interior space into the air tank 18 through a second valve 14. The compressed air is ideally supplied from the air tank 18 for use by the engine 1 (as described above).

The compressor crank shaft 6 may be selectively coupled to the engine crank shaft 5 based on pressure in the air tank, this being a preferred possibility but not the only possibility. As such, when the air pressure in the air tank 20 is below a threshold predefined, predetermined or preconfigured level, compressor 2 is connected to the engine 1 via clutch 5 and is operative to generate compressed air to increase the pressure in the air tank 18. When the air pressure in the air tank 20 is at or above the same or a different threshold predefined, predetermined or preconfigured level, compressor 2 may be disconnected from the engine 1 via clutch 5 and is no longer operative to generate compressed air. The compressor crank shaft 6 may be selectively coupled to the engine crank shaft 5 by a controllable clutch, such as but not limited to automatic clutch 5. The control device to operate clutch 5 may be a remotely situated control unit coupled, e.g., mechanically or electrically, to the clutch 5. Such connections known to those in the art to which this invention pertains may be used in the invention.

The flow of air from ambient environment into the interior space defined in part by the piston compressor through the first valve is regulated during a stroke of the piston compressor away from a surface of the compressor cylinder in which the first valve is situated. The flow of compressed air from the interior space into the air tank through the second valve is regulated during another stroke of the piston compressor toward from the surface of the compressor cylinder in which the second valve is situated.

In one embodiment, a turbocharger or similar apparatus is connected to an outlet conduit of the engine through which exhaust gas flows, a compressor is connected to the turbocharger or similar apparatus, and in operation, air is input from the ambient environment into the compressor wherein it is compressed upon exhaust of gas from the engine, and the compressed air is directed from the compressor to the air tank, e.g., through a conduit. In this case, the compressor crank shaft may be decoupled from the engine crank shaft once the compressor 22 is providing compressed air to the air tank to maintain the pressure in the air tank above a threshold level.

Although the engine 1 is shown in a schematic, the complete construction thereof would be readily ascertainable by those skilled in the art to which this invention pertains in view of the disclosure herein. For example, it is understood that the pistons described above have a conventional shape of a piston while the cylinders in which the piston move have a conventional shape of a cylinder. The connections of the rods of the pistons to the crank shafts and the structure of the crank shafts are also known in the art. The manner in which the cranks shafts 5, 6 are mounted to enable their rotation are also known to those skilled in the art to which this invention pertains, and may involve use of bearings and the like. The conduits described above may be any type of pipe or tubular component defining a passage therein for flow of air and/or fuel and/or exhaust gas. The air tank disclosed below may have any shape. The engine block in which the combustion chambers are situated may be any shape. To the extent needed, the disclosures of the following U.S. patents are incorporated by reference herein, U.S. Pat. Nos. 5,491,977, 6,449,965, 7,111,704, 7,621,253, 8,191,517, 8,322,138, 8,499,727, 8,714,119 and 9,033,834.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. Furthermore, the absence of structure in the drawings may be, in some embodiments, considered to indicate that such structure is intentionally lacking and omitted in an engine or other arrangement disclosed herein. The absence of such structure can, in some embodiments, provide benefits.

The invention claimed is:

1. An apparatus for providing a source of compressed air for an engine having an engine cylinder and an engine crank shaft, comprising:
   a rotatable compressor crank shaft;
   a compressor cylinder defining an interior space and including a surface defining said interior space having a first aperture and a second aperture;
   a first valve at least partly in said first aperture;
   a second valve at least partly in said second aperture;
   a piston compressor that moves upon rotation of said compressor crank shaft in said interior space of said compressor cylinder;
   a compressor intake conduit leading from ambient environment to said first aperture;
   an air tank in which compressed air is stored;
   a compressor outlet conduit leading from said second aperture to said air tank;
   an engine intake conduit leading from said air tank to an interior space of said engine cylinder of the engine; and
   interconnection structure that selectively interconnects said compressor crank shaft to the engine crank shaft to provide two operating states wherein in one of the operating states, rotation of the engine crank shaft causes rotation of said compressor crank shaft and in the other of the operating states, said compressor crank shaft is not rotated by the engine crank shaft when the engine crank shaft rotates, said interconnection structure comprising an automatic clutch connected to the engine crank shaft and a gear connected to said automatic clutch and said compressor crank shaft,
   whereby rotation of said compressor crank shaft causes movement of said piston compressor in said interior space of said compressor cylinder and compression of air inlet into said interior space of said compressor cylinder through said compressor intake conduit and said first valve and outflow of compressed air through said compressor outlet conduit and said second valve to said air tank.

2. The apparatus of claim 1, wherein said piston compressor comprises a rod connected eccentrically to said compressor crank shaft.

3. The apparatus of claim 2, wherein said piston compressor further comprises a piston having head portion connected to said rod and movable in said interior space of said compressor cylinder while surrounded by said compressor cylinder.

4. An engine, comprising:
   the apparatus of claim 1,
   an engine piston moved upon rotation of said engine crank shaft in said interior space of said engine cylinder, said engine cylinder including a surface defining said interior space having a first aperture and a second aperture, said interior space of said engine cylinder being supplied with ignitable fuel, said engine intake conduit leading from said air tank to said first aperture of said engine cylinder;

a third valve at least partly in said first aperture of said engine cylinder;

a fourth valve at least partly in said second aperture of said engine cylinder;

an igniter for igniting a mixture of fuel and air in said interior space of said engine cylinder; and an engine outlet conduit leading from said second aperture of said engine cylinder.

5. The engine of claim 4, wherein said piston compressor comprises a rod connected eccentrically to said compressor crank shaft, and said compressor outlet conduit is entirely separate from said engine intake conduit.

6. The engine of claim 5, wherein said piston compressor further comprises a piston having head portion connected to said rod and movable in said interior space of said compressor cylinder while surrounded by said compressor cylinder.

7. The engine of claim 4, further comprising:
a turbocharger connected to said engine outlet conduit;
a turbocharger compressor connected to said turbocharger;
a turbocharger compressor inlet conduit leading from the ambient environment to said turbocharger compressor;
a compressor conduit leading from said turbocharger compressor to said air tank; and
a valve in each of said engine intake conduit and said compressor conduit and which is controlled to maintain pressure of compressed air in said air tank,
whereby exhaust gas flowing through said engine outlet conduit interacts with said turbocharger to power said turbocharger compressor to draw air from the ambient environment through said turbocharger compressor inlet conduit, compress the drawn air from the ambient environment and provide the compressed air to said air tank through said compressor conduit.

8. An engine, comprising
an engine having an engine cylinder defining an interior space and including a surface defining said interior space having a first aperture and a second aperture, the interior space being supplied with ignitable fuel;
an engine crank shaft;
an engine piston that moves upon rotation of said engine crank shaft in said interior space of said engine cylinder;
a first valve at least partly in said first aperture;
a second valve at least partly in said second aperture;
an air tank in which compressed air is stored;
an engine intake conduit leading from said air tank to said first aperture;
an igniter for igniting a mixture of fuel and air in said interior space of said engine cylinder;
an engine outlet conduit leading from said second aperture;
a turbocharger connected to said engine outlet conduit;
a turbocharger compressor connected to said turbocharger;
a turbocharger compressor inlet conduit leading from the ambient environment to said turbocharger compressor;
a compressor conduit leading from said turbocharger compressor to said air tank; and
an apparatus for providing an additional source of compressed air for said air tank, said apparatus comprising:

a rotatable compressor crank shaft;
a compressor cylinder defining an interior space and including a surface defining said interior space having a first aperture and a second aperture;
a third valve at least partly in said first aperture of said surface of said compressor cylinder;
a fourth valve at least partly in said second aperture of said surface of said compressor cylinder;
a piston compressor moved upon rotation of said compressor crank shaft in said interior space of said compressor cylinder;
a compressor intake conduit leading from the ambient environment to said first aperture of said surface of said compressor cylinder;
a compressor outlet conduit leading from said second aperture of said surface of said compressor cylinder to said air tank; and
interconnection structure that selectively interconnects said compressor crank shaft to said engine crank shaft to provide two operating states wherein in one of the operating states, rotation of said engine crank shaft causes rotation of said compressor crank shaft and in the other of the operating states, said compressor crank shaft is not rotated by said engine crank shaft when said engine crank shaft rotates,
whereby rotation of said compressor crank shaft causes movement of said piston compressor in said interior space of said compressor cylinder and compression of air inlet into said interior space of said compressor cylinder through said compressor intake conduit and said first valve and outflow of compressed air through said compressor outlet conduit and said second valve to said air tank, and
whereby exhaust gas flowing through said engine outlet conduit interacts with said turbocharger to power said turbocharger compressor to draw air from the ambient environment through said turbocharger compressor inlet conduit, compress the drawn air from the ambient environment and provide the compressed air to said air tank through said compressor conduit.

9. The engine of claim 8, wherein said interconnection structure comprises an automatic clutch connected to said engine crank shaft and a gear connected to said automatic clutch and said compressor crank shaft.

10. A method for compressing air using an engine having an engine crank shaft, comprising:
selectively coupling a rotatable compressor crank shaft to the engine crank shaft by a controllable clutch to provide an operating state of the engine in which the compressor crank shaft is coupled to the engine crank shaft and another operating state in which the compressor crank shaft is not coupled to the engine crank shaft;
generating, when the compressor crank shaft is in the operating state wherein it is coupled to the engine crank shaft, compressed air upon rotation of the compressor crank shaft by causing the compressor crank shaft to move a piston compressor in an interior space of a compressor cylinder, regulating flow of air from ambient environment into the interior space defined in part by the piston compressor through a first valve, and regulating flow of compressed air from the interior space into an air tank through a second valve, the compressed air being stored in the air tank; and
supplying compressed air from the air tank for use by the engine when the compressor crank shaft is in the operating state wherein it is coupled to the engine crank shaft and also when the compressor crank shaft is in the operating state wherein it is not coupled to the engine crank shaft.

11. The method of claim 10, wherein the compressor crank shaft is selectively coupled to the engine crank shaft based on pressure in the air tank.

12. The method of claim 10, wherein the flow of air from ambient environment into the interior space defined in part by the piston compressor through the first valve is regulated during a stroke of the piston compressor away from a surface of the compressor cylinder which the first valve abuts.

13. The method of claim 12, wherein the flow of compressed air from the interior space into the air tank through the second valve is regulated during another stroke of the piston compressor toward from the surface of the compressor cylinder which the second valve abuts.

14. The method of claim 10, wherein the flow of compressed air from the interior space into the air tank through the second valve is regulated during a stroke of the piston compressor toward from a surface of the compressor cylinder which the second valve abuts.

15. The method of claim 10, further comprising:
connecting a turbocharger to an outlet conduit of the engine through which exhaust gas flows;
connecting a compressor to the turbocharger;
intaking air from the ambient environment into the compressor wherein it is compressed upon exhaust of gas from the engine; and
directing the compressed air from the compressor to the air tank.

16. The method of claim 15, further comprising disconnecting the coupling of the compressor crank shaft to the engine crank shaft once the compressor is providing compressed air to the air tank to maintain the pressure in the air tank above a threshold level.

* * * * *